United States Patent
Rao et al.

(10) Patent No.: US 6,950,014 B2
(45) Date of Patent: Sep. 27, 2005

(54) METHOD FOR OPERATING A PRE-CRASH SENSING SYSTEM IN A VEHICLE HAVING EXTERNAL AIRBAGS

(75) Inventors: Manoharprasad K. Rao, Novi, MI (US); Gary Steven Strumoto, Beverly Hills, MI (US); Kwaku O. Prakah-Asante, Commerce Township, MI (US); Saeed David Barbat, Farmington Hills, MI (US); Peter J. Schuster, Atascadero, CA (US)

(73) Assignee: Ford Global Technologies LLC, Dearborn, MI (US)

(*) Notice: Subject to any disclaimer, the term of this patent is extended or adjusted under 35 U.S.C. 154(b) by 0 days.

(21) Appl. No.: 10/604,801

(22) Filed: Aug. 18, 2003

(65) Prior Publication Data

US 2004/0107033 A1 Jun. 3, 2004

Related U.S. Application Data

(63) Continuation-in-part of application No. 09/683,779, filed on Feb. 13, 2002.
(60) Provisional application No. 60/432,973, filed on Dec. 13, 2002.

(51) Int. Cl.⁷ .............................................. B60Q 1/00
(52) U.S. Cl. ...................... 340/438; 340/435; 340/436; 340/441; 340/903; 701/45; 701/301
(58) Field of Search ................................ 340/438, 435, 340/436, 441, 903, 901; 701/45, 46, 47, 301, 300; 180/167, 168, 170; 280/734, 735, 770, 762

(56) References Cited

U.S. PATENT DOCUMENTS

| | | | |
|---|---|---|---|
| 5,646,613 A | | 7/1997 | Cho |
| 6,031,484 A | * | 2/2000 | Bullinger et al. ............. 342/72 |
| 6,106,038 A | | 8/2000 | Dreher |
| 6,408,237 B1 | | 6/2002 | Cho |
| 6,474,679 B2 | | 11/2002 | Miyasaka et al. |
| 6,519,519 B1 | | 2/2003 | Stopczynski |
| 6,560,520 B2 | | 5/2003 | Yokota et al. |
| 6,687,577 B2 | * | 2/2004 | Strumolo ...................... 701/1 |
| 6,749,218 B2 | * | 6/2004 | Breed ......................... 280/735 |
| 2002/0014761 A1 | | 2/2002 | Miyasaka et al. |
| 2002/0093180 A1 | | 7/2002 | Breed |

* cited by examiner

*Primary Examiner*—Hung Nguyen
(74) *Attorney, Agent, or Firm*—Frank A. MacKenzie; Artz & Artz (57) ABSTRACT

A pre-crash sensing system (10) for an automotive vehicle (50) is coupled to an external airbag system (120). The external airbag system (120) may include a bumper airbag (126), a grill airbag (122) or a bumper airbag and a grill airbag. An object classifier is used to generate an object classification signal. A controller (12) is coupled to the object classifier and the external airbag system for varying an activation level of the external airbag system (120) in response to the object classification signal.

18 Claims, 6 Drawing Sheets

METHOD FOR OPERATING A PRE-CRASH SENSING SYSTEM IN A VEHICLE HAVING EXTERNAL AIRBAGS

CROSS REFERENCE TO RELATED APPLICATIONS

The present invention is a Continuation-In-Part of U.S. patent application Ser. No. 09/683,779 filed Feb. 13, 2002, and claims priority to provisional application No. 60/432,973 filed Dec. 13, 2002

BACKGROUND OF INVENTION

The present invention relates to pre-crash sensing systems for automotive vehicles, and more particularly, to pre-crash sensing systems having external airbags operated in response to pre-crash detection.

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are deployed.

In certain crash situations it would be desirable to provide information before forces actually act upon the vehicle when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation. In the development of external airbag systems, it is desirable to avoid unintentional airbag activations when the host vehicle is maneuvering at high speeds, low speeds, or when traveling on a sharp curved road.

Vehicle front-end mounted external airbag systems could be useful for pedestrian protection and also for vehicle-to-vehicle collision compatibility enhancement applications. In order to achieve optimum performance, the external bags are required to be fully deployed before physical contact with the collision objects. Pre-crash sensing systems are highly desirable for effective implementation of external airbag applications.

It would be desirable to provide a system that takes into consideration the size and type of the collision object in an external airbag deployment application to achieve robust safety performance and enhanced reliability.

SUMMARY OF INVENTION

The present invention provides an improved pre-crash sensing system that provides different levels of external airbag activation based upon the collision object sensed.

In one aspect of the invention, a control system for an automotive vehicle includes an external airbag system. The external airbag system may include a bumper bag, a grill airbag or a bumper bag and a grill airbag. An object classifier is used to generate an object classification signal. A controller is coupled to the object classifier and an airbag control module for varying an activation level of the external airbag system in response to the object classification signal.

In a further aspect of the invention, a method for operating a pre-crash sensing system for an automotive vehicle having an external airbag includes establishing a decision zone relative to the vehicle, detecting an object within the decision zone, classifying the object into an object classification, determining an external airbag activation rate corresponding to the object classification, and activating the external airbag system at the activation rate.

One advantage of the invention is that the size and orientation of the sensed object may be taken into consideration in the activation determination. This is extremely useful if the object is another automotive vehicle such as a sport utility, car or truck or a pedestrian. By classification of the collision object, various rates for the airbag deployment appropriate for the object may be chosen.

Other advantages and features of the present invention will become apparent when viewed in light of the detailed description of the preferred embodiment when taken in conjunction with the attached drawings and appended claims.

DETAILED DESCRIPTION

In the following figures the same reference numerals will be used to identify the same components.

While the present invention is illustrated with respect to several types of remote object sensors, various types and combinations of remote object sensors may be used as will be further described below.

Figure 1:
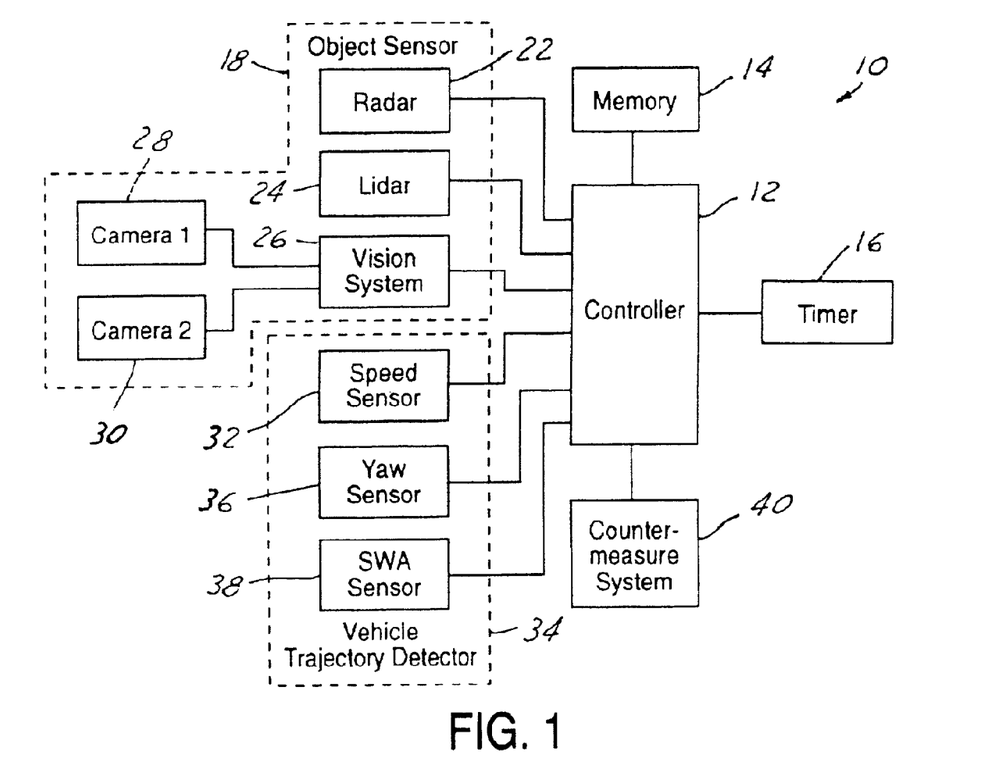
FIG. 1 is a block diagrammatic view of a pre-crash sensing system according to the present invention.

Referring now to FIG. 1, a pre-crash sensing and countermeasure control system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down.

A remote object sensor 18 is coupled to controller 12. Remote object sensor 18 generates an object signal in the presence of an object within its field of view. Remote object sensor 18 may be comprised of one or a number of types of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. When used as a stereo pair, cameras 28 and 30 acting together are also capable of detecting the distance of an object from the vehicle. Alternatively, as will be further described below, radar 22 or lidar 24 may be used to detect an object within a detection zone and vision system 26 may be used to confirm the presence of the object within the decision zone and to provide the classification and size of the object to controller 12. In another embodiment of the invention vision system consisting of cameras 1 and 2, alone may use established triangulation techniques to determine the presence of an object and the distance from the vehicle, determine object classification characteristics as well as the object's size that may include area, height or width, or combinations thereof.

A speed sensor 32 is also coupled to controller 12. Speed sensor 32 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 32 may include, for example, toothed wheel sensors such as those employed on anti-lock brake systems.

A vehicle trajectory detector 34 is also coupled to controller 12. The vehicle trajectory detector 34 generates a signal indicative of the vehicle traveling on a curved road. The vehicle trajectory detector 34 may comprise various numbers or combinations of sensors but preferably include a yaw rate sensor 36, vehicle speed sensor 32 and a steering wheel angle sensor 38. Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. As will be further set forth below, the yaw rate sensor 36 and the vehicle speed sensor 32 or the steering wheel angle sensor 38 alone, or the above sensors in combination, may be used to indicate a curved road.

Controller 12 is used to control the activation of a countermeasure system 40 by generating an activation control signal. Each countermeasure may have an individual actuator associated therewith. In that case, controller 12 may direct the individual countermeasure actuator to activate the countermeasure. Various types of countermeasure systems will be evident to those skilled in the art. Examples of countermeasures within a countermeasure system include occupant belt pretensioning, bumper height changing, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors. As will be described below, the controller 12 may act as an object classifier and choose the countermeasure and/or deployment rate based on type and orientation of the target vehicle or object which is determined from the object sensor 18. If the object sensor 18 is configured with sufficient computing capability, it may also act as the object classifier. The classifier may be implemented in many forms including but not limited to a decision tree implemented in software, fuzzy logic, or a neural network.

Figure 2:
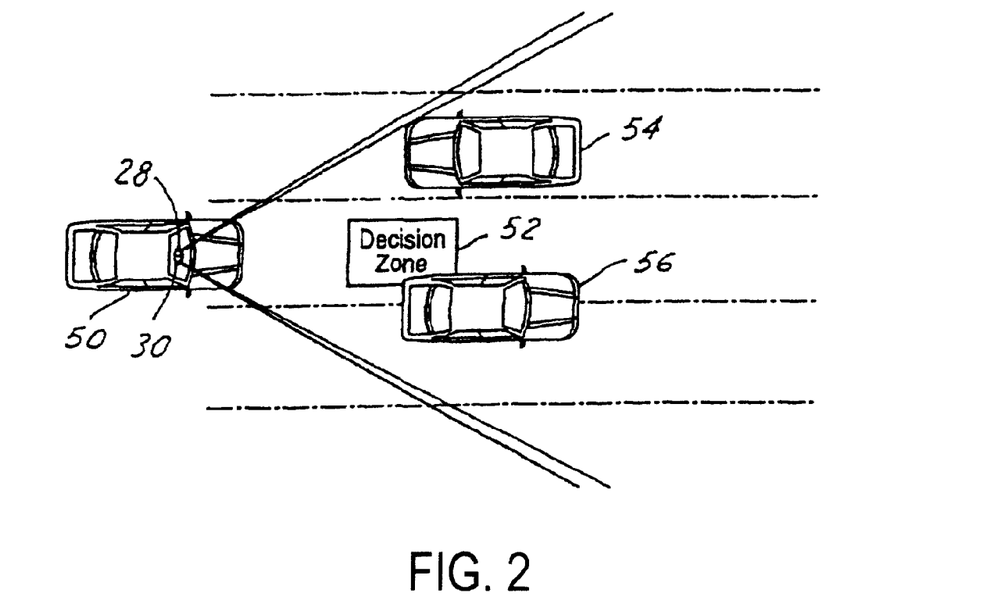
FIG. 2 is a top view of an automotive vehicle having a stereo pair of cameras 28, 30 mounted behind the rear view mirror.

Referring now to FIG. 2, a vehicle 50 is illustrated having a decision zone in front thereof. The width of the decision zone is a predetermined quantity depending upon the width of the host vehicle. The longitudinal dimensions of the danger zone depend upon the relative velocity coverage requirements and the vision system coverage capabilities. An oncoming vehicle 54 is illustrated as well as an ongoing vehicle 56 traveling in the same direction as vehicle 50. When the object enters the decision zone the present invention is activated.

A stereo pair of cameras 28, 30 are used on vehicle 50. The camera system alone or together with the controller 12 can also be used to detect the presence of an object in the danger zone, obtain its distance, relative velocity, size, orientation information and classification. For pre-crash sensing applications, it is preferable to have both radar and vision based systems to ensure good performance under all weather conditions and also to provide redundancy for improved reliability.

Figure 3:
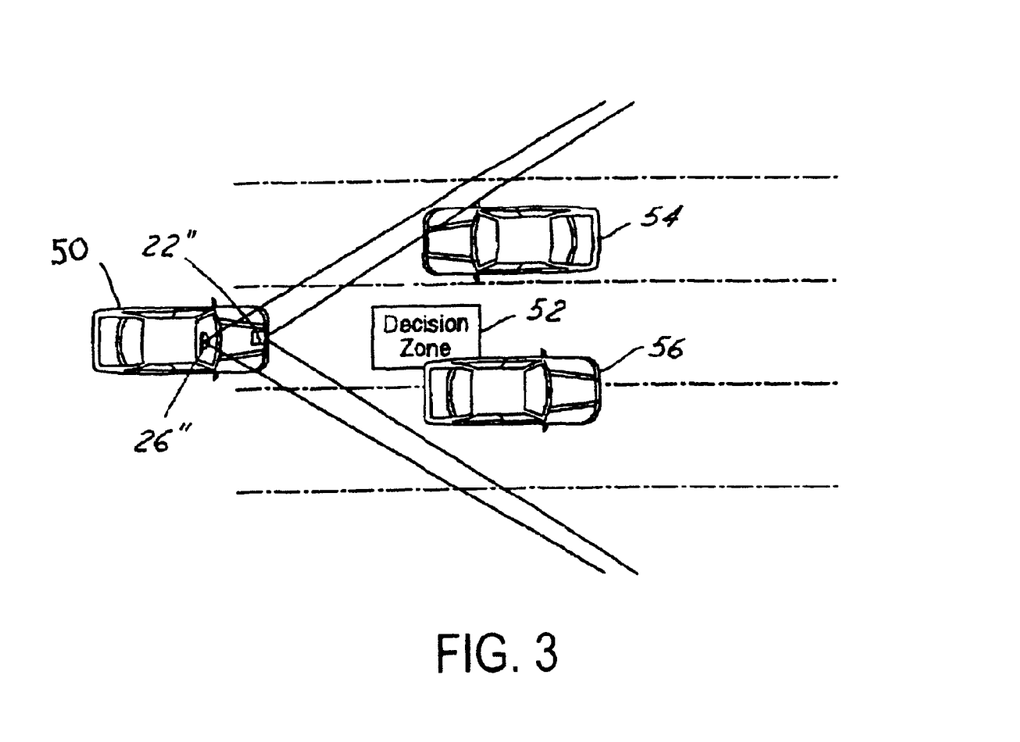
FIG. 3 is a top view of an automotive vehicle having another alternative object sensor 18 including a radar 22"" and vision system 26"".

Referring now to FIG. 3, a vehicle 50 pre-crash sensing system shows a scanning radar or lidar 22"" in combination with a vision system 26"". The radar 22"" can thus detect the presence of an object within the decision zone, while camera 26"" can confirm the presence of the object in the decision zone, classify the object and verify the size and orientation of the object.

Figure 4:
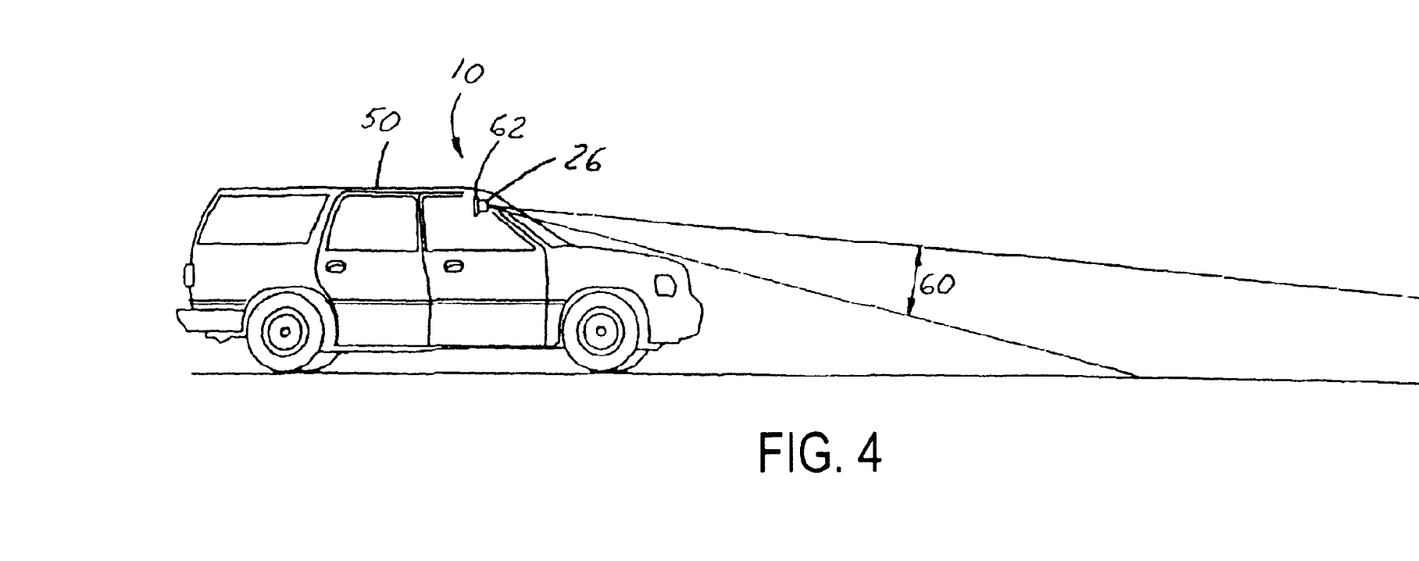
FIG. 4 is a side view of an automotive vehicle indicating the vision sensor line of sight in front of the vehicle.

Referring now to FIG. 4, automotive vehicle 50 is illustrated having a vision system 26 mounted at the back of a rear view mirror 62. A typical line of sight of the vision system, which defines the near side of the vehicle longitudinal decision zone in FIGS. 2 and 3 is shown. Radar sensors are typically mounted in front of the vehicle, behind the front grill or behind the front bumper fascia and have fields of coverage, which are unrestricted by the host vehicle's front end.

Figure 5:
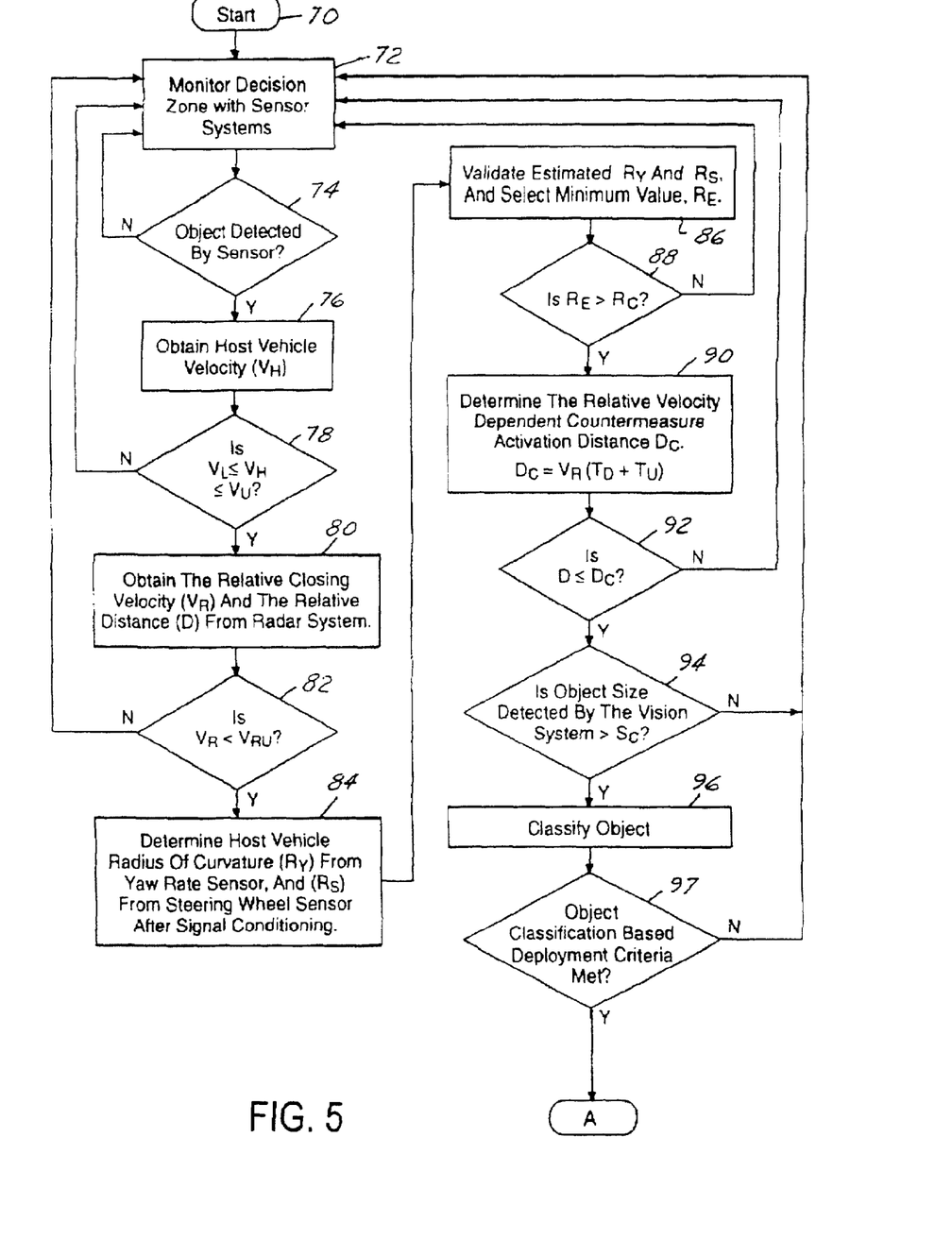
FIGS. 5 and 6 are a flow chart of a method for operating the pre-crash sensing system according to the present invention.

Referring now to FIG. 5, a method according to the present invention starts at step 70. In step 72, the decision zone in front of the vehicle is monitored with the remote object detector. In the present example, the decision zone is monitored with both radar and vision systems. If an object has not been detected in the decision zone, step 72 is again executed. If an object has been detected by the remote object detector, step 76 is executed. In step 76, the host vehicle velocity ($V_H$) is determined. In this example the host vehicle is vehicle 50 described above. In step 78, a low speed threshold value $V_L$ and a high speed threshold value $V_U$ are established. In step 78 the host vehicle velocity (i.e., speed) ($V_H$) is compared with a first threshold ($V_L$) and a second threshold ($V_U$). The first threshold is a low speed threshold and the second threshold is a high speed threshold. Thus, if the host vehicle speed is less than the low speed threshold or greater than or equal to the high speed threshold, step 72 is again executed. If the host vehicle speed is between the low speed threshold and the high speed threshold, then step 80 is executed. Step 78 helps minimize inadvertent, unintentional, and non-useful deployments during real world driving situations.

In step 80 the relative velocity ($V_R$) and the distance D from the radar system are determined for the closing object. In step 82 a relative velocity threshold value $V_R$ is established. In step 82, if the closing relative velocity ($V_{RU}$ is not less than a upper threshold $V_{RU}$, then step 72 is again executed. In step 82 if the closing velocity ($V_R$) is less than $V_{RU}$, step 84 determines the host vehicle trajectory radius of curvature ($R_Y$) from the yaw rate sensor, vehicle speed sensor, and the host vehicle trajectory radius of curvature ($R_S$) from the steering wheel sensor after appropriate signal conditioning as will be evident to those skilled in the art. In step 86, the radii of curvature from the yaw rate ($R_Y$) and from the steering wheel sensor ($R_S$) are validated to ensure that they are within a proper range and are not erroneous readings. One method for validation is to compare previous values for the radius of curvature to determine if a value has changed at a rate greater than that physically achievable by the automotive vehicle. A minimum value is selected between the radius of curvature from the yaw rate and from the steering wheel sensor. This minimum value is the estimated radius of curvature ($R_E$).

In step 88, a radius of curvature threshold value ($R_C$) is established. The estimated radius of curvature ($R_E$) is compared with the threshold. If the estimated value is not greater than the threshold then step 72 is again executed. If the estimated radius of curvature value ($R_E$) is greater than the radius of curvature threshold, then step 90 is executed. Step 88 prevents the system from operating when the vehicle is traveling on a very curved trajectory to prevent an unintentional deployment.

In step 90, the relative velocity dependent countermeasure activation distance ($D_C$) is determined as a function of the closing relative velocity, a device deployment time dependent variable ($T_D$), and an update rate ($T_U$) of the sensing system. That is, $D_C=V_R(T_D+T_U)$. In step 92, if the relative distance D from the radar system is not less than or equal to the countermeasure activation distance ($D_C$) step 72 is again executed. If the relative distance D is less than or equal to countermeasure activation distance ($D_C$), step 94 is executed. In step 94, object size threshold ($S_C$) is established. In step 94 the object size is compared with an object size threshold ($S_C$). If the object size is not greater than the size threshold ($S_C$), then step 72 is executed. If the object size is greater than the threshold, step 96 is executed. In step 94 object size may correspond to various characteristics of the object. For example, the object height may be determined. The object width may also be determined. By knowing both the object width and object height, the object area may also be determined.

In step 96, the object may be classified. The object may be classified into various classes depending on the object size and other characteristics as identified by the remote object sensor 18. Also, the size of the object may be classified for orientation. The orientation may ultimately lead to a different decision as to which of the countermeasures may be activated and may also define the mode of activation of the selected countermeasures. By looking at the object area or the object height and width as a function of time, a front view of a sport utility vehicle or car may be distinguished from the side view.

In step 97, object size and orientation information is compared to object classification based deployment criteria for external airbag system. If the classification based deployment criteria are not satisfied then step 72 is again executed. If the object classification based deployment criteria are satisfied then the control is transferred to step 100 of FIG. 6.

Figure 6:
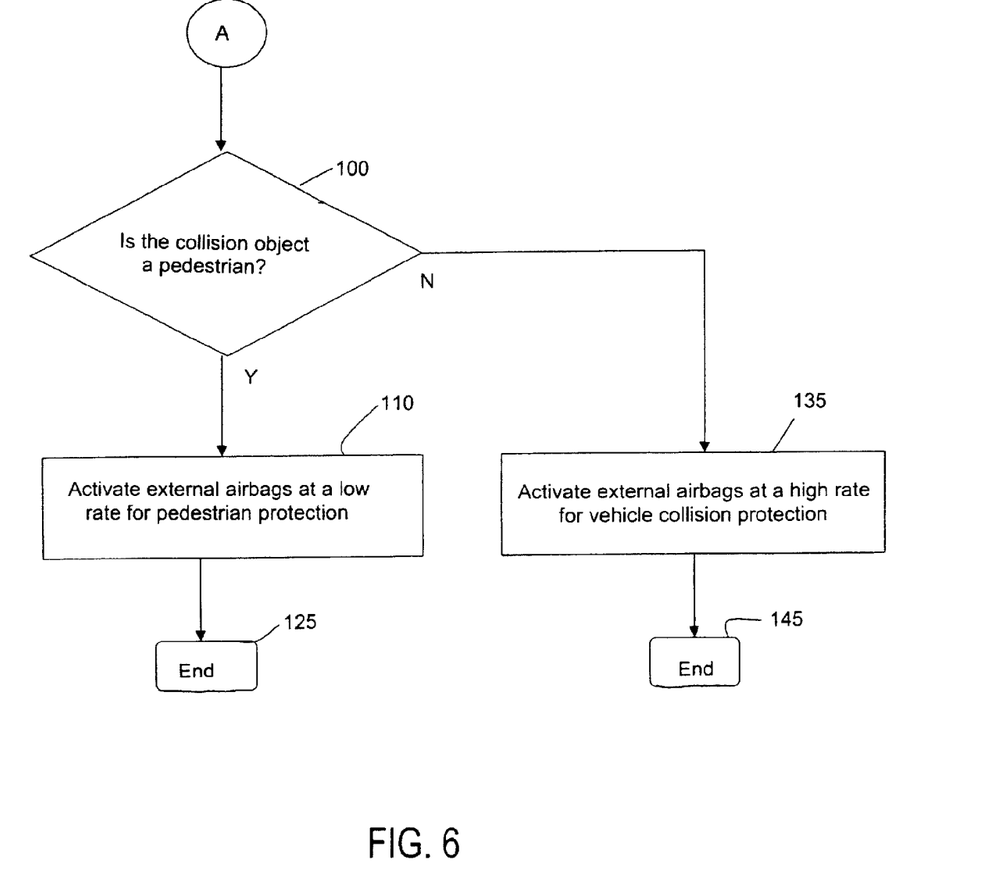

In step 100 of FIG. 6, a decision is made regarding the collision object based on the object classification information. If the collision object is a pedestrian, step 110 is executed in which external airbag system 120 is activated at a slow rate. In the present example both a grill airbag 122 and a bumper airbag 126 are deployed simultaneously or nearly simultaneously. In step 125, the method ends after activation.

Referring back to step 100, if the collision object is not a pedestrian, step 135 is executed. In step 135 the external system 120 is operated at a high rate. The operation rate may be larger than that of the slow rate described above with respect to step 110. In step 135 an appropriate inflation rate may be determined based upon the object classification, which is in turn based upon the object size, the orientation of the vehicles, etc. Thus, a higher rate may be used for larger object for vehicle compatibility versus those of a pedestrian. Small vehicles versus large vehicles may also have different deployment rates. In step 145, the method ends after activation.

Figure 7:
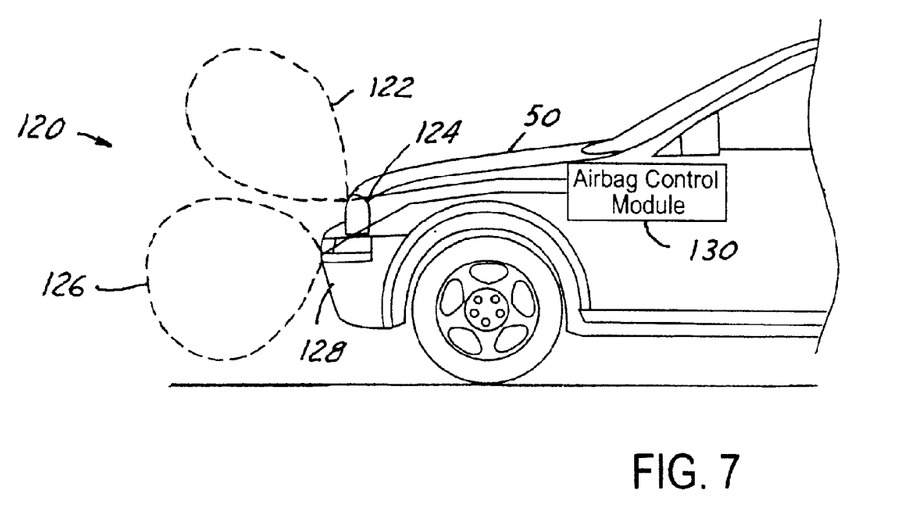
FIG. 7 is a side view of an external airbag system formed according to the present invention.

Referring now to FIG. 7, the automotive vehicle 50 is illustrated having an external airbag system 120 as a vehicle countermeasure. External airbag system 120 has a first or grill airbag 122 that extends from the grill 124 of the automotive vehicle 50 and covers the front upper part of the vehicle. A second or bumper airbag 126 is illustrated as being deployed from bumper 128 and covers the front lower part of the vehicle. In a constructed embodiment one or both of airbags 122, 126 may be employed. When only one airbag is used, the complete front-end of the vehicle may be covered by the single airbag. The airbags may be deployed at different rates based upon the charge provided by the devices. An airbag control module 130 coupled to the airbags 122, 126 generates a control signal to control the rate at which the airbags expand by controlling gas generation and gas flow. As described with reference to FIGS. 5 and 6, by means of the controller 12 and the airbag control module 130 the airbags may be controlled to expand at different rates to accommodate different classifications of objects. In its simplest form, the present embodiment may have one rate of expansion of the airbags for pedestrians and a second rate for other objects such as an automotive vehicle. The rate for pedestrians may be lower than that of those for the automotive vehicle.

While particular embodiments of the invention have been shown and described, numerous variations and alternate embodiments will occur to those skilled in the art. Accordingly, it is intended that the invention be limited only in terms of the appended claims.

What is claimed is:

1. A pre-crash sensing and countermeasure deployment control system for an automotive vehicle coupled to a countermeasure system having an external airbag system, said pre-crash sensing system and countermeasure deployment comprising:

an object classifier generating an object classification signal, the object classifier comprises a radar or lidar unit generating an object distance signal and object relative velocity signal and a vision system generating the object classification signal that comprises object sizes including object area and object height; and a controller coupled to said object classifier for varying an inflation rate of the external airbag in response to said object classification signal, object distance signal, and the object relative velocity signal.

2. A system as recited in claim 1 wherein said object classification comprises classifying collision objects into pedestrian and non-pedestrian objects.

3. A system as recited in claim 1 further comprising a vehicle speed sensor generating a longitudinal speed signal corresponding to the longitudinal speed of the vehicle; wherein said controller activates said external airbag in response to the longitudinal speed signal.

4. A system as recited in claim 1 further comprising a decision zone; wherein said radar or lidar sensor generates an object distance and relative velocity signals from an object within said decision zone and said vision sensor confirms the presence of the object within the said decision zone.

5. A system as recited in claim 1 wherein varying the activation rate comprises varying the activation rate from a high rate to a low rate.

6. A system as recited in claim 5 wherein the low rate corresponds to an object classification of a pedestrian.

7. A system as recited in claim 5 wherein the high rate corresponds to an object classification of a second vehicle.

8. A system as recited in claim 1 wherein the external airbag system comprises a bumper bag.

9. A system as recited in claim 1 wherein the external airbag system comprises a grill bag.

10. A system as recited in claim 1 wherein the external airbag system comprises a bumper bag and a grill bag.

11. A method for operating a pre-crash sensing and countermeasure deployment control system for an automotive vehicle having an external airbag system, said method comprising:
    establishing a decision zone relative to the vehicle;
    detecting an object within the decision zone;
    classifying the object into an object classification by determining object sizes including object area and object height;
    determining an external airbag inflation rate corresponding to the object classification; and
    activating the external airbag system at the inflation rate.

12. A method as recited in claim 11 wherein determining comprises choosing between a low inflation rate and a high inflation rate.

13. A method as recited in claim 11 wherein the low inflation rate corresponds to a pedestrian classification.

14. A method as recited in claim 11 wherein the high inflation rate corresponds to a vehicle classification.

15. A method as recited in claim 11 wherein activating the external airbag system at the inflation rate comprises activating a grill airbag.

16. A method as recited in claim 11 wherein activating the external airbag system at the inflation rate comprises activating a bumper airbag.

17. A method for operating a pre-crash sensing and countermeasure deployment control system for an automotive vehicle having an external airbag system, said method comprising:
    detecting an object;
    classifying the object by determining object sizes including object area and object height;
    when the object is a pedestrian, activating an external airbag of the external airbag system at a first inflation rate;
    when the object is a second vehicle, activating the external airbag system at a second inflation rate greater than the first inflation rate.

18. A method as recited in claim 17 wherein the second rate corresponds to object size.

* * * * *